(12) United States Patent
Bamba

(10) Patent No.: US 9,778,838 B2
(45) Date of Patent: Oct. 3, 2017

(54) VESSEL TOUCH PANEL DEVICE

(71) Applicant: YAMAHA HATSUDOKI KABUSHIKI KAISHA, Iwata-shi, Shizuoka (JP)

(72) Inventor: Takaaki Bamba, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 59 days.

(21) Appl. No.: 15/083,580

(22) Filed: Mar. 29, 2016

(65) Prior Publication Data
US 2016/0313859 A1 Oct. 27, 2016

(30) Foreign Application Priority Data
Apr. 21, 2015 (JP) .................................. 2015-086926

(51) Int. Cl.
*G06F 3/041* (2006.01)
*G06F 3/0488* (2013.01)

(52) U.S. Cl.
CPC ................................. *G06F 3/0488* (2013.01)

(58) Field of Classification Search
CPC combination set(s) only.
See application file for complete search history.

(56) References Cited

U.S. PATENT DOCUMENTS

2016/0179333 A1* 6/2016 Shi .......................... G06F 3/044
  715/863
2017/0068447 A1* 3/2017 Hong .................. G06F 3/04817

FOREIGN PATENT DOCUMENTS

JP              62-40640 U      3/1987

* cited by examiner

*Primary Examiner* — Van Chow
(74) *Attorney, Agent, or Firm* — Keating and Bennett, LLP

(57) ABSTRACT

A vessel touch panel device mounted on a vessel includes a touch panel, a first instruction output that outputs a first instruction when a first operation instruction is input to the touch panel, a second instruction output that outputs a second instruction when a second operation instruction is input to the touch panel, a non-touch panel type activation operator that is provided separately from the touch panel, and a controller. The activation operator is operated by a user in order that a state of the vessel touch panel device is transferred from a first state where the first instruction output is inactive to a second state where the first instruction output is active. The controller performs activation control based on when a predetermined first condition is satisfied when in the first state, and deactivation control when in the second state a predetermined second condition is satisfied.

14 Claims, 11 Drawing Sheets

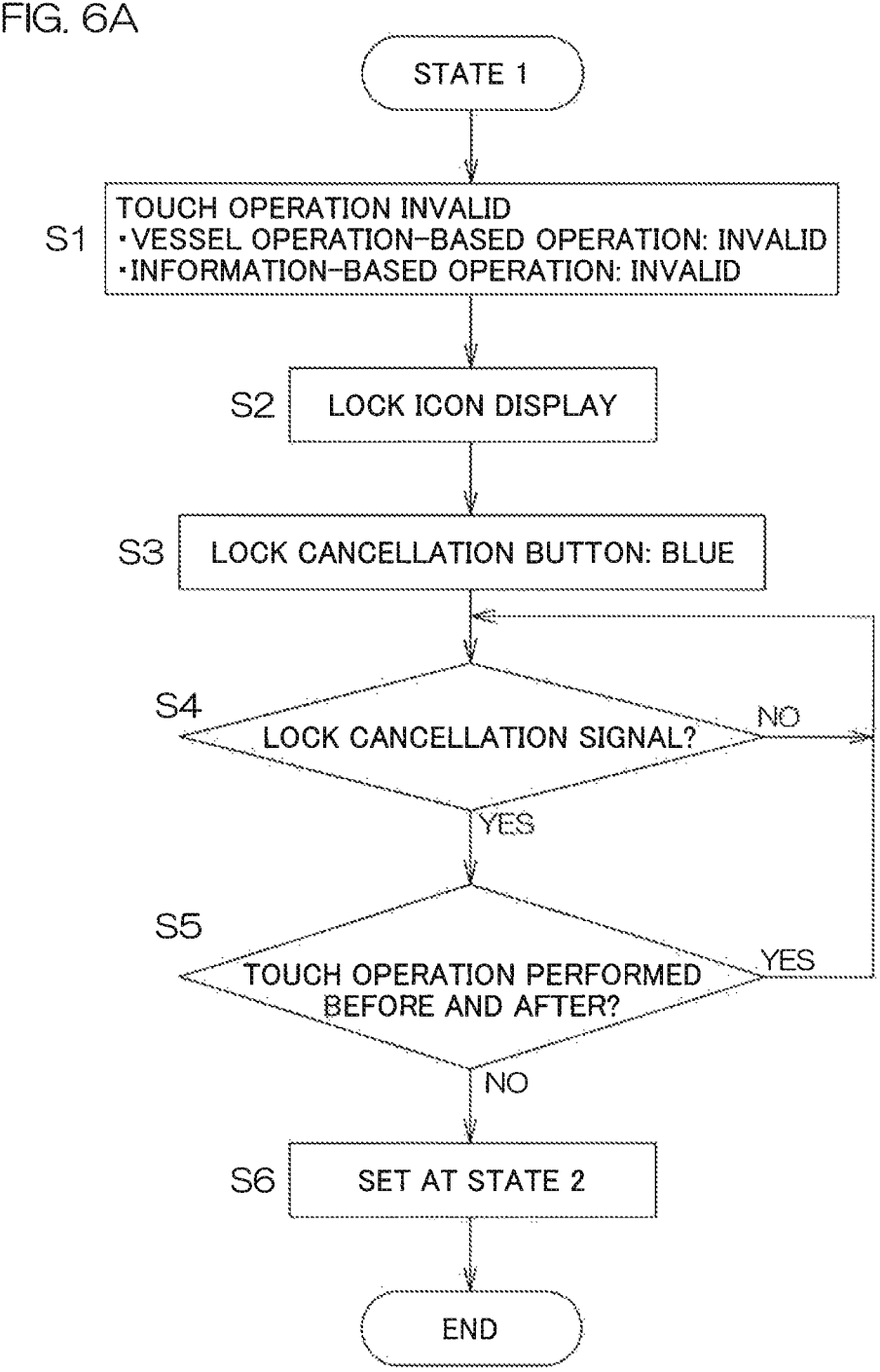

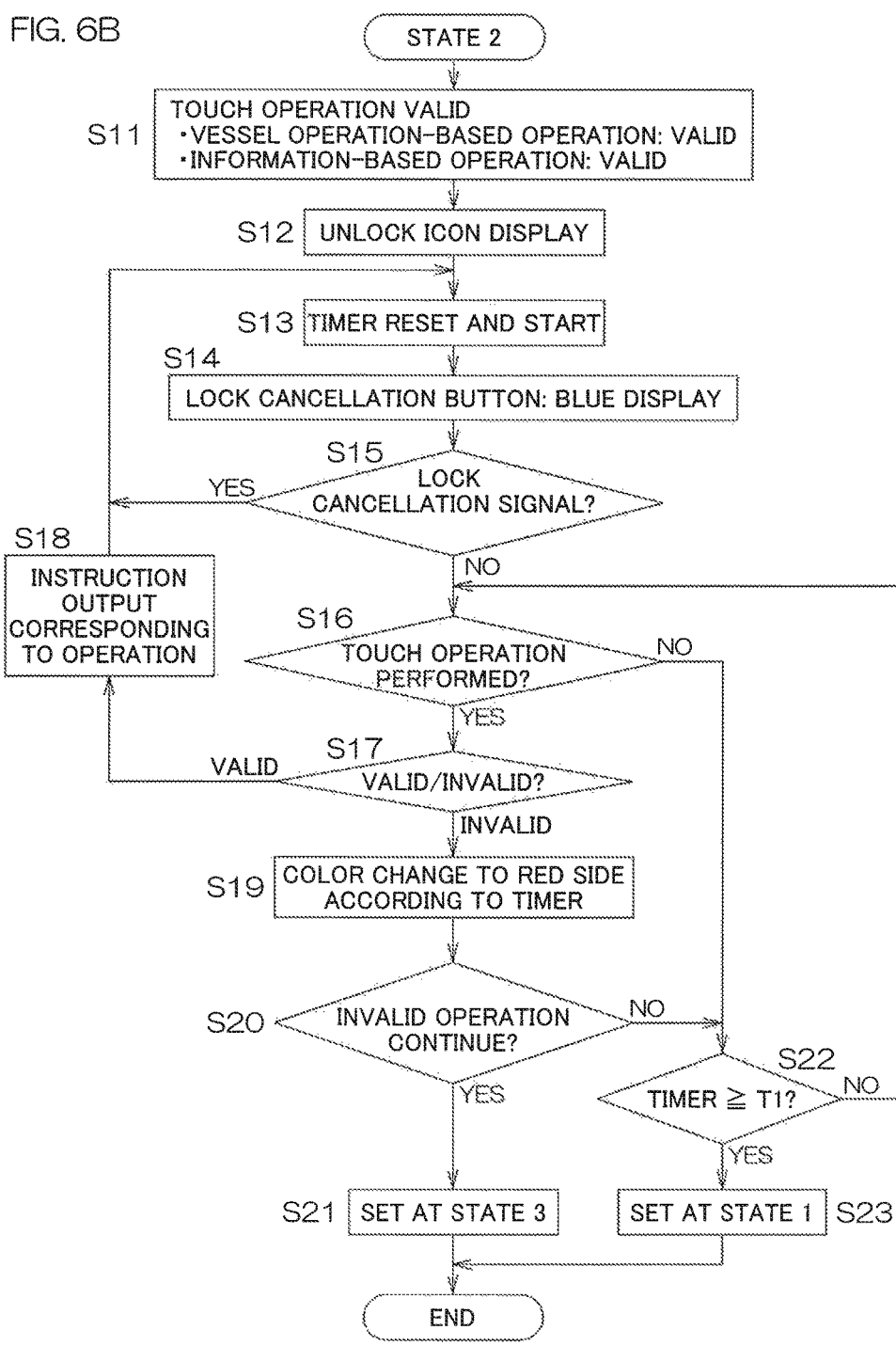

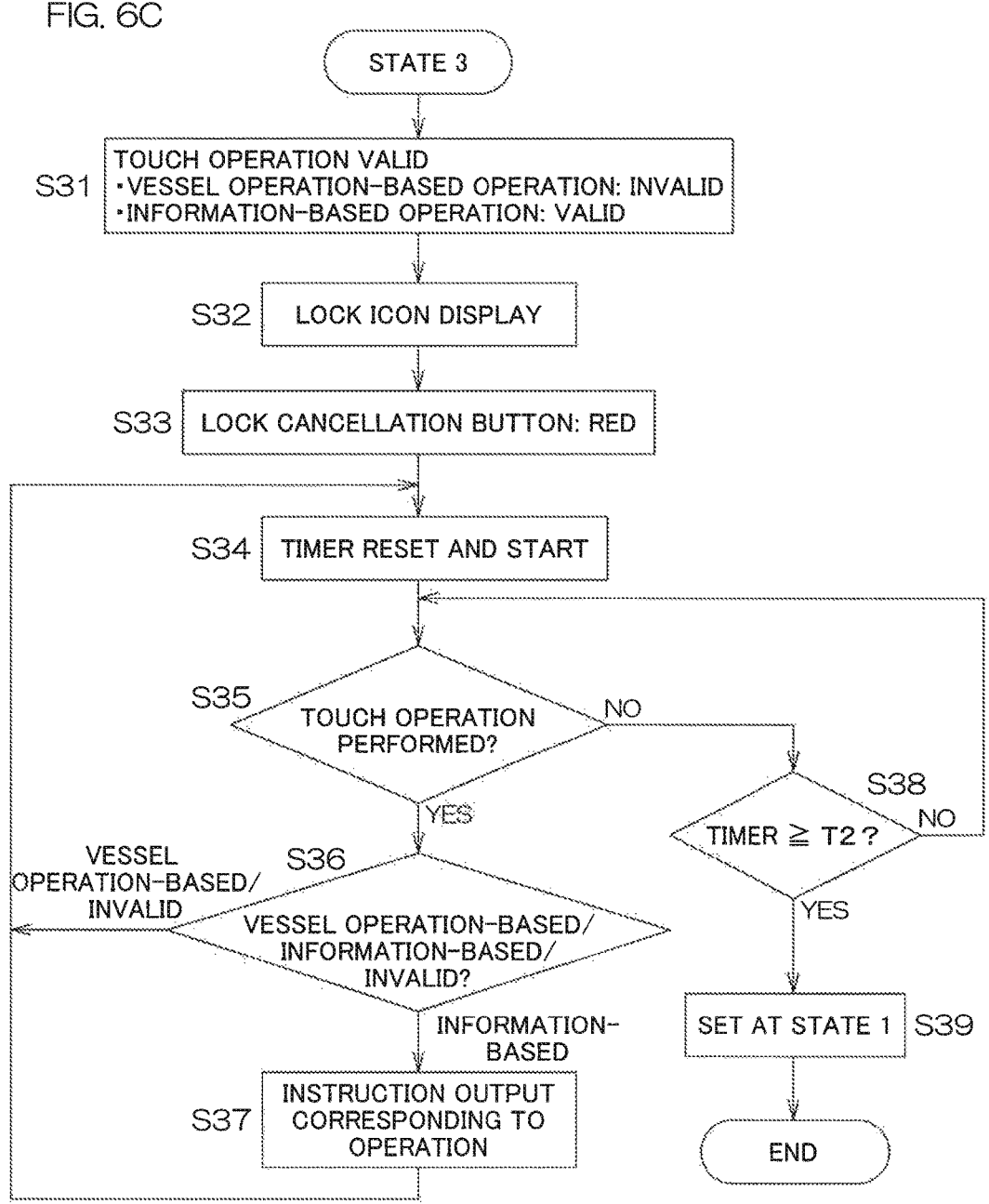

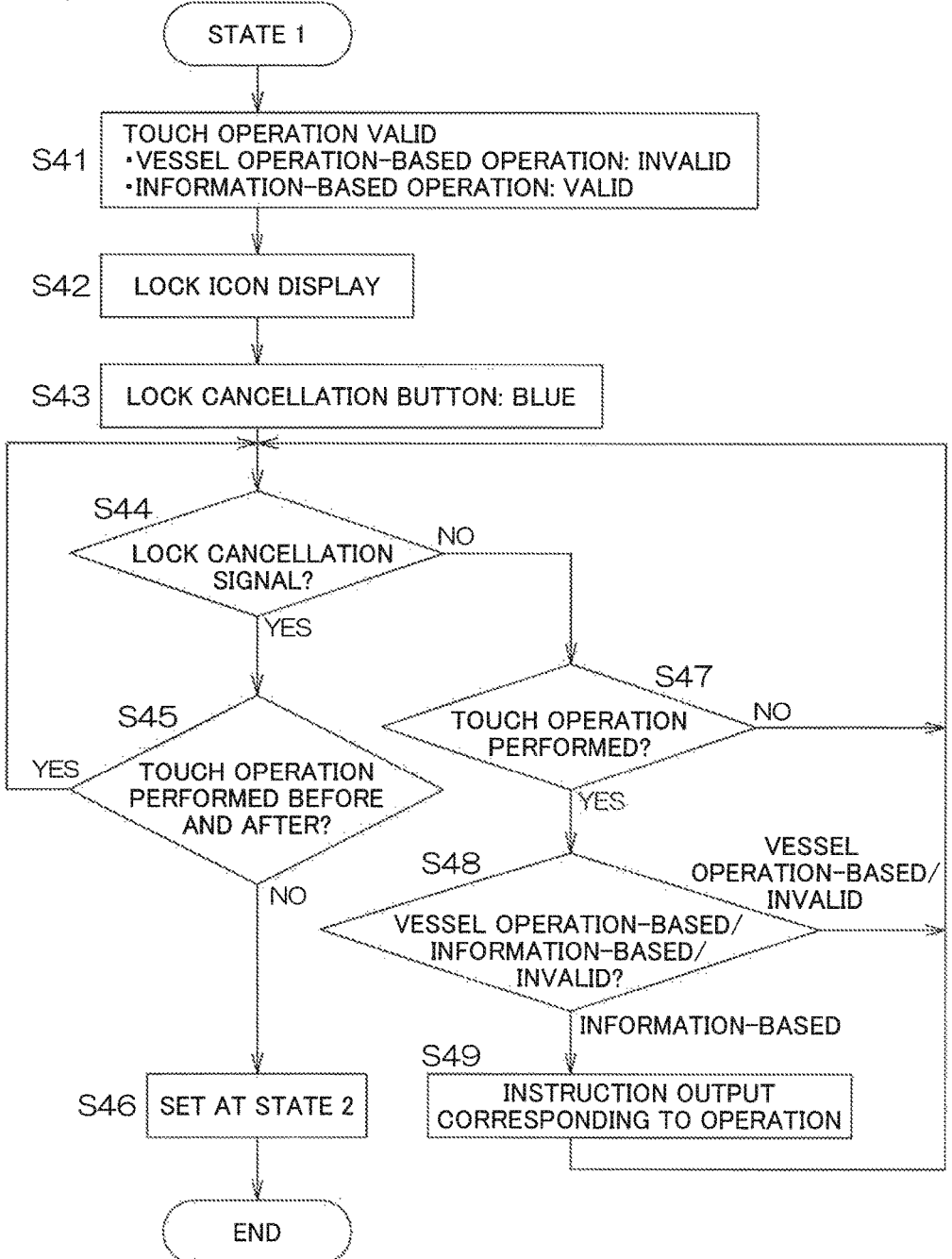

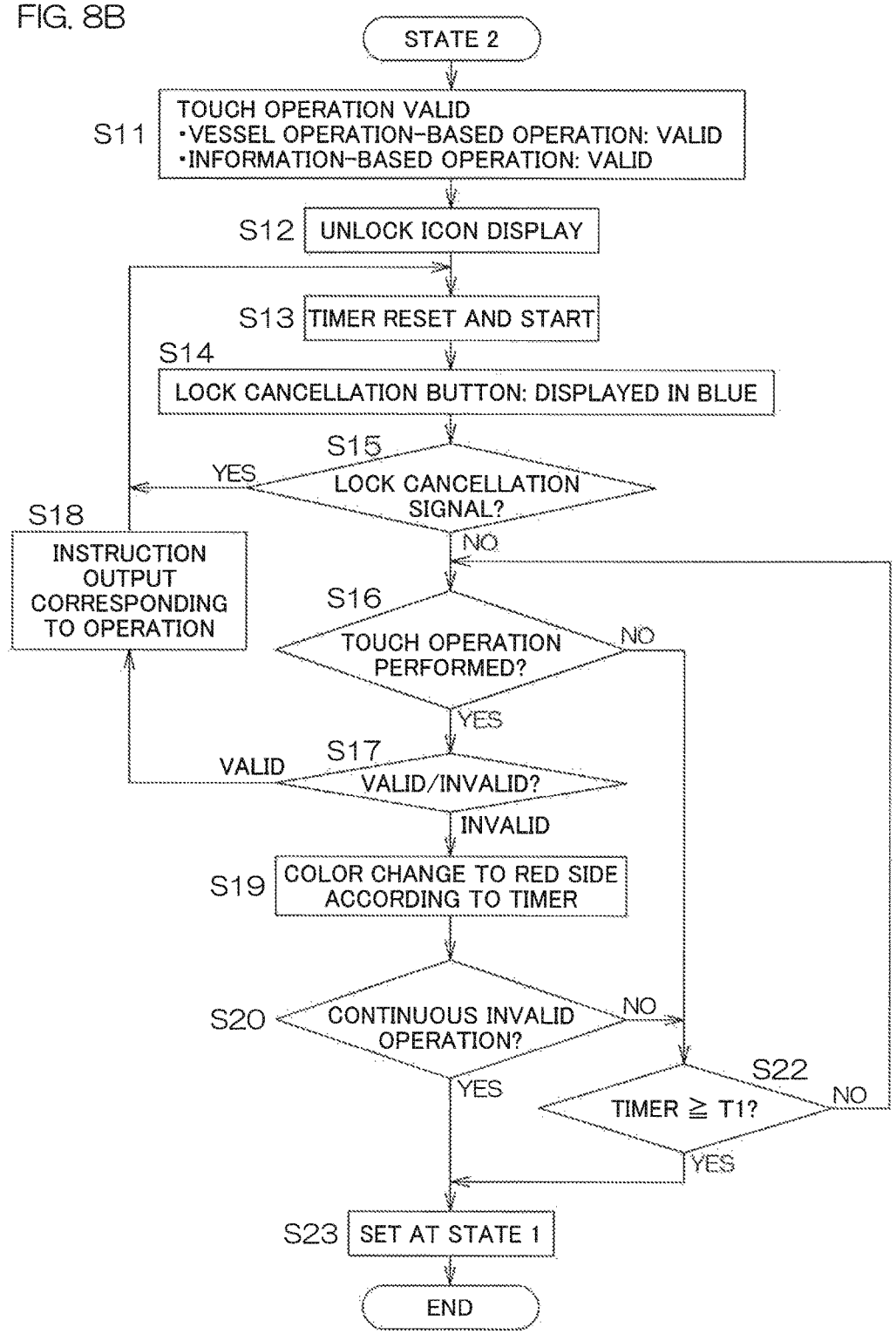

VESSEL TOUCH PANEL DEVICE

BACKGROUND OF THE INVENTION

1. Field of the Invention

The present invention relates to a vessel touch panel device which is mounted on a vessel including a propulsion machine and with which it is possible to input an operation instruction to the propulsion machine.

2. Description of the Related Art

An example of an operation device mounted on a vessel is disclosed in Japanese Utility Model Application Publication No. 62-40640. Japanese Utility Model Application Publication No. 62-40640 discloses an erroneous operation prevention device for a vessel automatic steering device. Specifically, when a setting switch is operated while an erroneous operation prevention confirmation switch is being operated, various values, a mode or the like of the vessel automatic steering device is set or specified. When the erroneous operation prevention confirmation switch is not operated, even if the setting switch is operated, the setting value or the mode is not changed. In this way, an erroneous operation caused by the pitching and rolling of a vessel or the like is prevented.

SUMMARY OF THE INVENTION

The inventor of preferred embodiments of the present invention described and claimed in the present application conducted an extensive study and research regarding a vessel operation device, such as the one described above, and in doing so, discovered and first recognized new unique challenges and previously unrecognized possibilities for improvements as described in greater detail below.

In the prior art of Japanese Utility Model Application Publication No. 62-40640, it is necessary to continuously operate the erroneous operation prevention confirmation switch when the vessel automatic steering device is operated. Hence, since it is necessary to perform the operation with both hands on a vessel that is pitching and rolling, an operator cannot perform the operation while acquiring a stable posture.

On the other hand, recently, touch panel devices having the function of operating a propulsion machine are available to be mounted on vessels. Among them, a touch panel device is used that includes, on a display screen, a capacitance-type position input device (sensor film) which has excellent operability.

However, when water droplets or the like are adhered on the screen of the touch panel device, an unintended input may be received. In particular, when the touch panel device is disposed on an outdoor console, since seawater splashes and raindrops reach the input surface of the touch panel device, an unintended input may be produced.

Hence, it may be considered that in order to cope with an erroneous input caused by water droplets or the like, the prior art of Japanese Utility Model Application Publication No. 62-40640 is used. However, in this case, as described above, since it is necessary to perform the operation with both hands, the posture of the operator is disadvantageously unstable. Because the posture of the operator is unstable, the possibility of an erroneous input is increased. Moreover, disadvantageously, when the erroneous operation prevention confirmation switch is disposed within the display screen of the touch panel device, the erroneous operation prevention confirmation switch is erroneously operated by water droplets or the like.

On the other hand, it can be considered that a physical operation switch such as an operation knob or an operation button is provided separately from the touch panel device. In this case, under conditions in which an erroneous input to the touch panel device may be produced, the operator performs a lock operation to invalidate the input to the touch panel device, and then uses the physical operation switch to perform various types of operations and settings.

However, when the operator fails to perform the lock operation, an erroneous input is produced. Moreover, when the operator does not perform a lock cancellation operation to cancel the invalidation, an operation using the touch panel device cannot be performed. Furthermore, since the user needs to determine, according to the weather and the navigation state, the timing with which the locking is performed and cancelled, determining the timing puts a burden on the user.

The physical operation switch is additionally provided, and thus the cost is significantly increased, and the design quality is lowered. Moreover, for example, it is necessary to previously determine the lock operation with the touch panel device and the lock cancellation operation with the physical operation switch and design a system according to the operations thus determined. Furthermore, the user needs to memorize the two types of operations, that is, the operation with the touch panel device and the operation with the physical operation switch. When the types of operation inputs allowed by the operation touch panel device and the types of operation inputs allowed by the physical operation switch differ from each other, since it is necessary to determine which one of the operations is to be used, this puts a heavier burden on the user.

In order to overcome the previously unrecognized and unsolved challenges described above, according to a preferred embodiment of the present invention, there is provided a vessel touch panel device that is to be mounted on a vessel including a propulsion machine, the vessel touch panel device including a touch panel, a first instruction output that outputs, when a first operation instruction to the propulsion machine is input to the touch panel, a first instruction corresponding to the first operation instruction, a second instruction output that outputs, when a second operation instruction excluding an operation instruction to the propulsion machine is input to the touch panel, a second instruction corresponding to the second operation instruction, a non-touch panel type activation operator that is operated by a user in order that a state of the vessel touch panel device is transferred from a first state where the first instruction output is inactive to a second state where the first instruction output is active, and that is provided separately from the touch panel, and a controller. The controller is configured or programmed to perform activation control when a predetermined first condition is satisfied in the first state and the activation operator is operated, the first state is transferred to the second state, and even when the operation of the activation operator is stopped, the second state is retained. The controller is further is configured or programmed to perform deactivation control when a predetermined second condition is satisfied in the second state, the second state is transferred to the first state.

In this arrangement, the first operation instruction is input to the touch panel to output the first instruction related to the propulsion machine. Hence, it is possible to input the operation instruction to the propulsion machine by the operation of the touch panel. The second operation instruction is input to the touch panel to output the second instruction not related to the propulsion machine. Hence, the touch panel is able to be used for operations other than the operation instruction to the propulsion machine. On the other hand, the non-touch panel type activation operator is provided separately from the touch panel.

The vessel touch panel device includes the first state where the vessel touch panel device does not respond to the first operation instruction to the touch panel and the second state where the vessel touch panel device responds to the first operation instruction to the touch panel to output the first instruction. The activation operator is a non-touch panel type operation switch that transfers the vessel touch panel device from the first state to the second state, and is provided separately from the touch panel. When the activation operator is operated, and the predetermined first condition is satisfied, the state is transferred to the second state, and thereafter even when the operation of the activation operator is stopped, the second state is retained. Hence, the operator is able to release his hand from the activation operator, and thus it is possible to operate the touch panel with one hand. In this way, the operator is able to maintain the posture on a pitching and rolling vessel, and thus the erroneous operation is reduced.

Since when in the second state, the predetermined second condition is satisfied, the second state is automatically transferred to the first state, it is not necessary to perform an operation of returning the state to the first state, with the result that the user does not need to memorize such an operation. Since the state is automatically transferred to the first state where the input of the first operation instruction is invalidated, the user does not need to determine whether or not the state is returned to the first state. When it is necessary to input the first operation instruction, the activation operator is operated, and thus the state is transferred to the second state where the vessel touch panel device responds to the input of the first operation instruction, with the result that the determination and the operation are prevented from becoming complicated and that the user needs to memorize only the input operation to the touch panel. In other words, it is not necessary to memorize the complicated operation of a large number of physical operation switches provided for the replacement of the input to the touch panel.

The touch panel is a display and input device that includes a display including a display screen and a position input device provided on the display screen to input a position on the display screen. The position input device may include a sensor sheet disposed on the display screen of the display.

In a preferred embodiment of the present invention, the first condition includes a condition in which an activation signal is generated by the operation of the activation operator. In this arrangement, when the activation operator is operated to generate the activation signal, the vessel touch panel device is transferred to the second state, the first instruction output is activated and the vessel touch panel device responds to the input of the first operation instruction. Hence, preferably, when the operation instruction is input to the propulsion machine, the activation operator is operated, and thereafter the first operation instruction is input to the touch panel.

In a preferred embodiment of the present invention, the first condition includes a condition in which when the activation operator is operated, an operation input to the touch panel is not detected. In this arrangement, in a state where the operation instruction to the touch panel is performed, even if the activation operator is operated, the vessel touch panel device is not transferred to the second state. In this way, under conditions in which an erroneous input is easily produced such as in a case where seawater splashes or the like cover the touch panel, it is possible to prevent the vessel touch panel device from being transferred to the second state.

The "when the activation operator is operated" may be within a predetermined time before the operation of the activation operator, within a predetermined time after the operation, or within a predetermined time before and after the operation.

The "operation input is not detected" may include a condition in which a valid operation input to the touch panel is not detected. In this case, when the input of the second operation instruction is detected, the first conditions do not apply. The "operation input is not detected" may include a condition in which an invalid operation input to the touch panel is not detected. In this case, when an input to the region other than the operation region where the operation buttons and the like are disposed is produced due to an input of seawater splashes or the like, the first conditions do not apply. The "operation input is not detected" may include a condition in which neither the valid operation input nor the invalid operation input is detected.

In a preferred embodiment of the present invention, the second condition includes a condition in which a first predetermined time has elapsed after the transfer from the first state to the second state. In this arrangement, after the vessel touch panel device is changed to the second state, the second state is retained for at least the first predetermined time and thereafter the second state is automatically transferred to the first state. Hence, since the operator is able to perform the operation on the touch panel while releasing the hand from the activation operator, the operator does not need to operate the vessel touch panel device by both hands. Thus, since it is possible to produce an input with a stable posture, it is possible to reduce the erroneous input.

In a preferred embodiment of the present invention, the second condition includes a condition in which each of the first operation instruction and the second operation instruction is not input for a second predetermined time or more. In this arrangement, when the state where each of the first and second operation instructions is not input to the touch panel is continued for the second predetermined time or more, the vessel touch panel device is automatically transferred to the first state. Hence, since the second state is retained while the first or second operation instruction is provided, it is possible to continue the input to the touch panel without operating the activation operator again. Thus, it is possible to reduce an operation load on the user.

In a preferred embodiment of the present invention, the second condition further includes a condition in which an invalid operation input to the touch panel is not detected for a third predetermined time or more. In this arrangement, the condition in which the vessel touch panel device is automatically transferred to the first state is that the first or second operation instruction is not input to the touch panel for the second predetermined time or more and that the invalid operation input to the touch panel is not detected for the third predetermined time or more. In this way, when an operation is not performed on the touch panel for a long period of time, it is possible to automatically transfer the vessel touch panel device to the first state.

Two or all of the first predetermined time, the second predetermined time, and the third predetermined time may be equal to each other. The two or three times whose lengths are equal to each other may be measured with the same timer.

In a preferred embodiment of the present invention, the second condition includes a condition in which an invalid operation input to the touch panel is continued a plurality of times. In this arrangement, when the invalid operation input is continued a plurality of times, the vessel touch panel device is automatically transferred to the first state. Hence, when the invalid operation input is continued due to seawater splashes or the like, the vessel touch panel device is automatically transferred to the first state, and the input of the first operation instruction is prevented. In this way, it is possible to reduce the erroneous operation of the propulsion machine caused by seawater splashes or the like. Moreover, since the vessel touch panel device is automatically transferred to the first state without the need of a determination by the user, it is possible to reduce a load on the user.

The "invalid operation input is continued a plurality of times" means, for example, that a time from a certain invalid operation input to the subsequent invalid operation input falls within a predetermined determination time and that between the invalid operation inputs, no valid operation input is produced.

In a preferred embodiment of the present invention, immediately after power is supplied to the vessel touch panel device, the controller is configured or programmed to control the vessel touch panel device such that the vessel touch panel device is in the first state. In this arrangement, the preset condition immediately after power is supplied to the vessel touch panel device is the first state. Hence, even when power is supplied under conditions in which seawater splashes or the like reach the surface of the touch panel, since the vessel touch panel device does not respond to the input of the first operation instruction, it is possible to avoid an erroneous operation on the propulsion machine.

In a preferred embodiment of the present invention, when in the second state, the activation operator is operated, the controller continues the second state. In this arrangement, the activation operator is operated, and thus it is possible to extend the duration time of the second state. In this way, it is possible to continue the input of the first operation instruction to the touch panel.

For example, when the first predetermined time, the second predetermined time, and the third predetermined time are measured with the timer, the timer is reset to restart the time measurement, and thus it is possible to extend the duration time of the second state.

In a preferred embodiment of the present invention, the first instruction output and the second instruction output are inactive in the first state, and the first instruction output and the second instruction output are active in the second state. In this arrangement, in the first state, the vessel touch panel device responds to neither the first operation instruction related to the operation of the propulsion machine nor the second operation instruction not related to the operation of the propulsion machine. In this way, in the first state, it is possible to prevent erroneous operations related to the first operation instruction and the second operation instruction.

The vessel touch panel device further includes a third state where the first instruction output is inactive and the second instruction output is active, and when in the second state, an invalid operation input to the touch panel is detected, the controller is configured or programmed to transfer the vessel touch panel device to the third state.

In this arrangement, in the third state, the vessel touch panel device does not respond to the input of the first operation instruction but responds to the input of the second operation instruction to the touch panel to output the second instruction. Hence, even when the invalid operation input is detected, and thus the vessel touch panel device is automatically transferred to the third state, the instruction operation not related to the operation of the propulsion machine is received. In this way, it is possible to provide the vessel touch panel device that achieves both the erroneous input prevention and convenience. For example, even when the vessel touch panel device is transferred from the second state to the third state by the invalid operation input due to seawater splashes or the like, the second operation instruction not related to the operation of the propulsion machine is received. In this way, it is possible to provide the vessel touch panel device that is able to respond to the operation instruction by the user as much as possible while avoiding the erroneous input related to the operation of the propulsion machine.

In a preferred embodiment of the present invention, when in the second state, the invalid operation input to the touch panel is continued a plurality of times, the controller is configured or programmed to transfer the vessel touch panel device to the third state.

In this arrangement, that the invalid operation input is continued a plurality of times is the condition in which the vessel touch panel device is automatically transferred to the third state. Hence, even when the operator erroneously produces the invalid operation input, the vessel touch panel device is prevented from being immediately transferred to the third state where the vessel touch panel device is inactive to the input of the first operation instruction. On the other hand, since the invalid operation input caused by seawater splashes or the like is continuously produced, the vessel touch panel device is automatically transferred from the second state to the third state under conditions in which seawater splashes or the like cover the surface of the touch panel. In this way, it is possible to avoid the operation of the propulsion machine caused by an unintentional erroneous input by the operator.

In a preferred embodiment of the present invention, in each of the first state and the second state, the second instruction output is active. In this arrangement, even in the first state, the vessel touch panel device does not respond to the input of the first operation instruction but responds to the input of the second operation instruction to the touch panel to output the second instruction. In other words, even in the first state, the instruction operation not related to the operation of the propulsion machine is received. In this way, it is possible to provide the vessel touch panel device that achieves both the erroneous input prevention and convenience.

In a preferred embodiment of the present invention, the vessel touch panel device further includes a notifier that notifies the user of a transfer of the state of the vessel touch panel device which is changed over time. In this arrangement, since it is possible to notify the user of the transfer of the state of the vessel touch panel device, the user is able to perform the operation while recognizing the state of the vessel touch panel device.

The notifier includes, for example, a display that displays the remaining time until the vessel touch panel device is transferred from the second state to the first state. For example, when the state where no input operation is produced in the second state is continued for a predetermined time, and the vessel touch panel device is automatically transferred to the first state, the display may be arranged so as to produce a display that is gradually changed from a certain display state to another display state as the time when no operation input is produced passes. For example, the display may be a color change display that is changed over time from a first color display to a second color display through the display of an intermediate color. In this case, the display of the intermediate color is set at a display in which a mixing ratio between the first and second colors is gradually changed, and thus it is possible to more clearly display the passage of time.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a flowchart for illustrating an operation of the processor in a state 1.

FIG. 6B is a flowchart for illustrating an operation of the processor in a state 2.

FIG. 6C is a flowchart for illustrating an operation of the processor in a state 3.

FIG. 8A is a flowchart for illustrating an operation of the processor in state 1.

FIG. 8B is a flowchart for illustrating an operation of the processor in state 2.

DETAILED DESCRIPTION OF THE PREFERRED EMBODIMENTS

Figure 1:
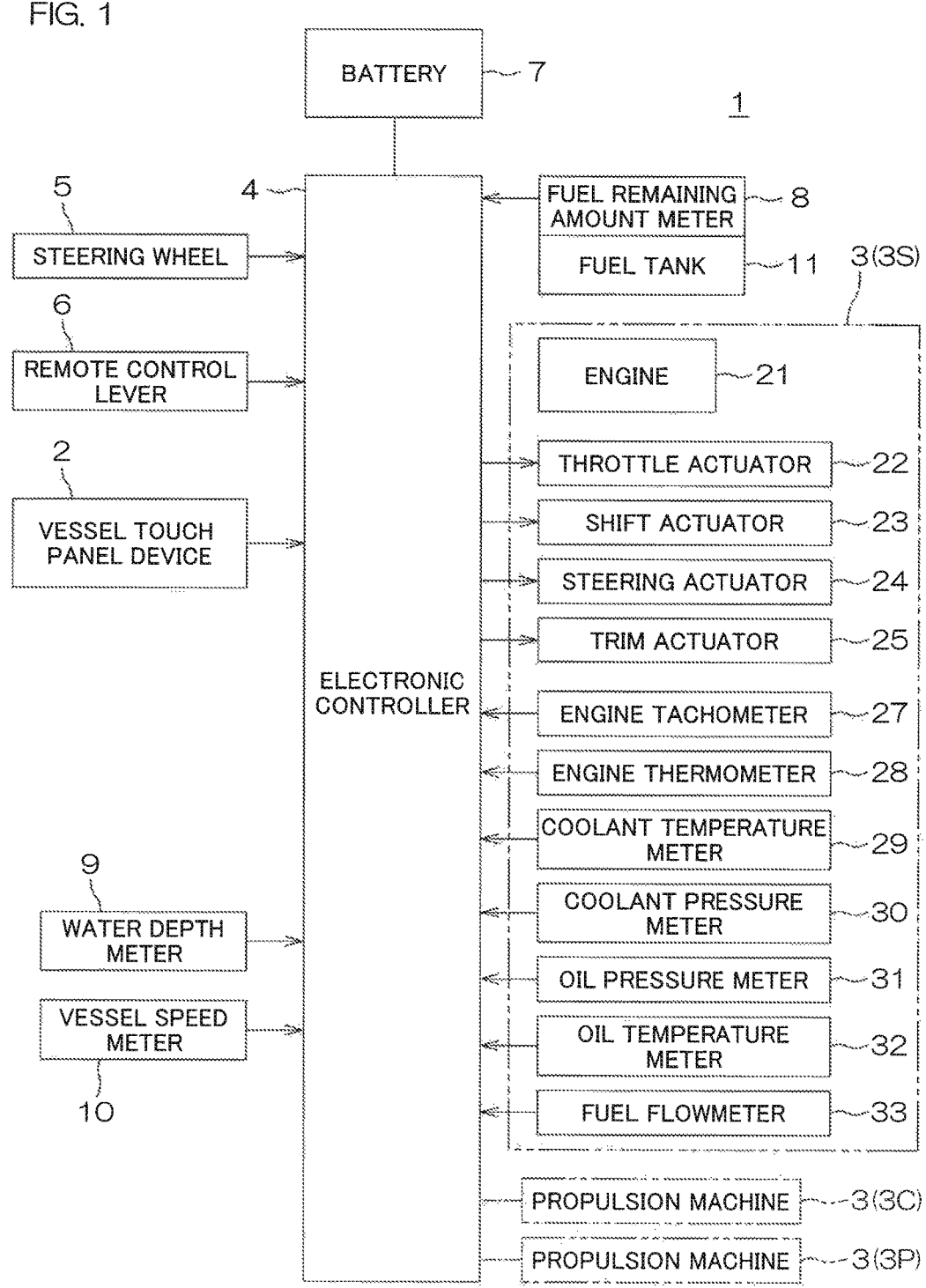
FIG. 1 is a block diagram mainly showing an electrical arrangement of a vessel including a vessel touch panel device according to a preferred embodiment of the present invention.

FIG. 1 is a block diagram mainly showing an electrical arrangement of a vessel including a vessel touch panel device according to a preferred embodiment of the present invention. The vessel 1 includes the vessel touch panel device 2, a propulsion machine 3, and an electronic controller 4. The vessel touch panel device 2 and the propulsion machine 3 are connected to the electronic controller 4. Furthermore, a steering wheel 5 serving as a steering device, a remote control lever 6 serving as an output instruction device, a battery 7, a fuel remaining amount meter 8, a water depth meter 9, and a vessel speed meter 10 are connected to the electronic controller 4.

The vessel touch panel device 2 is provided on the console of the vessel 1, that is, a maneuvering seat. The vessel touch panel device 2 is used as a display device that displays various types of information. In addition, the vessel touch panel device 2 is used as an input device for a vessel operator to input an operation instruction on the propulsion machine 3. The steering wheel 5 is provided on the maneuvering seat, and is an operation member that is operated by a vessel operator so as to change the traveling direction of the vessel 1. The remote control lever 6 is an operation member that is operated by the vessel operator so as to switch the direction of a propulsion force produced by the propulsion machine 3 between the forward and backward directions and to adjust the output of the propulsion machine 3. The battery 7 is connected to the electronic controller 4 to supply operation power to the electronic controller 4. Furthermore, the power of the battery 7 is also supplied to the vessel touch panel device 2, and is also supplied to electrical components included in the propulsion machine 3. The fuel remaining amount meter 8 measures the remaining amount of fuel within a fuel tank 11 included in the vessel 1, and inputs a signal indicating the result of the measurement to the electronic controller 4. The fuel within the fuel tank 11 is supplied to the propulsion machine 3 and is burned to produce the propulsion force. The water depth meter 9 measures the water depth around the vessel 1, and inputs a signal indicating the value thereof to the electronic controller 4. The vessel speed meter 10 measures the traveling speed of the vessel 1, and inputs a signal indicating the speed thereof to the electronic controller 4.

In this preferred embodiment, the propulsion machine 3 includes an internal combustion engine, that is, an engine 21. The engine 21 is a prime mover that receives the supply of the fuel from the fuel tank 11 and burns the fuel to produce a drive force. The propulsion machine 3 is preferably, for example, an outboard motor that is attached to the rear tail plate of a vessel body. The outboard motor is able to be turned leftward and rightward with respect to the vessel body, and change the direction of the propulsion force to the left and right. The outboard motor includes a shift mechanism in which the rotation force of the engine is transmitted to a propeller to switch the rotation direction of the propeller between the forward direction and the backward direction. Thus, the outboard motor is able to produce the propulsion force in the forward direction and the propulsion force in the backward direction. The shift mechanism includes a plurality of shift positions including a forward position which rotates the propeller in the forward direction, a backward position which rotates the propeller in the backward direction, and a neutral position which does not transmit the rotation force of the engine to the propeller. Furthermore, the outboard motor is arranged such that it is able to change an angle (trim angle) in an up/down direction with respect to the vessel body.

In this preferred embodiment, three propulsion machines 3P, 3C, and 3S (which are also collectively referred to as the "propulsion machine 3") are included, and these are aligned in the left/right direction and attached to the vessel stern. Specifically, the port propulsion machine 3P is attached to the port side of the vessel stern, the center propulsion machine 3C is attached to the center of the vessel stern, and the starboard propulsion machine 3S is attached to the starboard side of the vessel stern are included.

Each propulsion machine 3 includes, for example, the engine 21, a throttle actuator 22, a shift actuator 23, a steering actuator 24, and a trim actuator 25. The electronic controller 4 drives the steering actuator 24 based on a steering signal indicating the operation of the steering wheel 5. The steering actuator 24 steers the propulsion machine 3 in the left/right direction. In this way, the direction of the propulsion force is changed leftward and rightward with respect to the vessel body to change the traveling direction of the vessel 1. The electronic controller 4 controls, according to an output signal of the remote control lever 6, the throttle actuator 22 and the shift actuator 23. By controlling the shift actuator 23, the shift position of the shift mechanism is able to be set at any one of the forward position, the backward position, and the neutral position. By controlling the throttle actuator 22, the degree of throttle opening in the engine 21 is changed. Thus, the output of the engine 21 is adjusted, and the speed of the vessel 1 is changed accordingly. The trim actuator 25 is an actuator to change the trim angle of the propulsion machine 3.

Each propulsion machine 3 further includes an engine tachometer 27, an engine thermometer 28, a coolant temperature meter 29, a coolant pressure meter 30, an oil pressure meter 31, an oil temperature meter 32, and a fuel flowmeter 33. The engine tachometer 27 measures the rotation speed of the engine 21 (prime mover rotation speed), and inputs a signal indicating the value thereof to the electronic controller 4. The engine thermometer 28 measures the temperature (prime mover temperature) of the engine 21, and inputs a signal indicating the temperature to the electronic controller 4. The coolant temperature meter 29 measures the temperature of a coolant that cools the engine 21, and inputs a signal indicating the value thereof to the electronic controller 4. The coolant pressure meter 30 detects the pressure of the coolant, and inputs a signal indicating the value thereof to the electronic controller 4. The oil pressure meter 31 measures the pressure of a lubricant that lubricates the engine 21 and the like, and inputs a signal indicating the value thereof to the electronic controller 4. The oil temperature meter 32 measures the temperature of the lubricant that lubricates the engine 21 and the like, and inputs a signal indicating the value thereof to the electronic controller 4. The fuel flowmeter 33 measures the flow rate of fuel supplied from the fuel tank 11 to the engine 21 and burned therein, and inputs a signal indicating the value thereof to the electronic controller 4.

Figure 2:
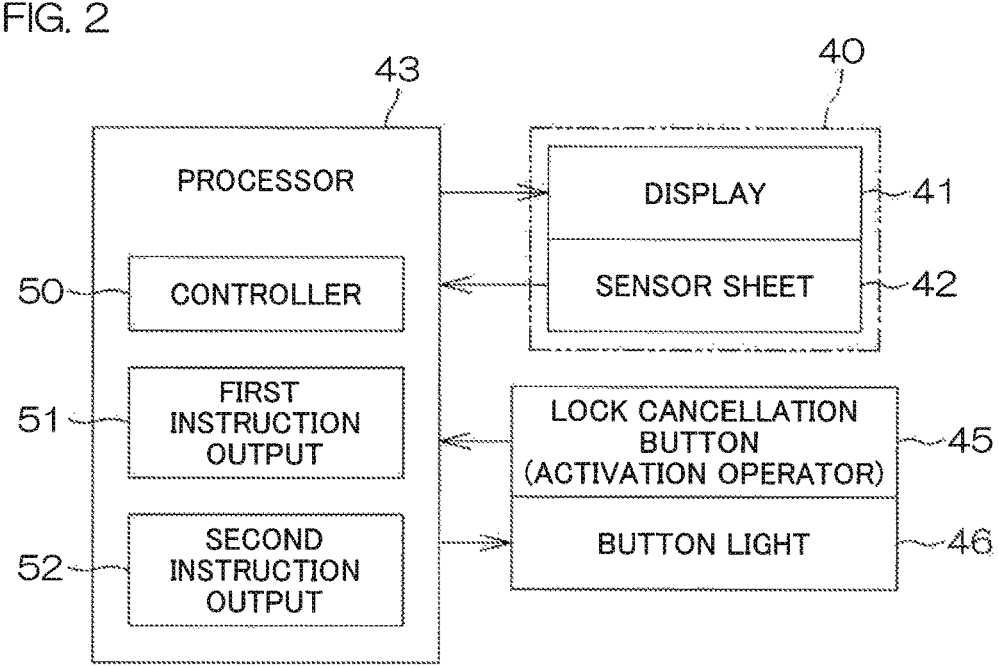
FIG. 2 is a block diagram for illustrating an electrical arrangement of the vessel touch panel device.

FIG. 2 is a block diagram for illustrating an electrical arrangement of the vessel touch panel device 2. The vessel touch panel device 2 includes a touch panel 40, a processor 43, and a lock cancellation button 45 serving as an activation operator. The touch panel 40 includes a display 41 and a sensor sheet 42. The display 41 includes a display screen that displays information supplied from the processor 43. The sensor sheet 42 is a position input device to input a position on the display screen, and includes a transparent sheet (transparent film) disposed on the display screen of the display 41. In this preferred embodiment, the sensor sheet 42 is a capacitance-type position input device, and is a transparent sheet member that can be seen through the display screen of the display 41.

The processor 43 is preferably a microcomputer, and includes a CPU, a ROM, and a RAM, and is arranged such that the CPU is operated according to a processing program recorded in the ROM. Thus, the processor 43 is configured or programmed to perform functions as a controller 50, a first instruction output 51, and a second instruction output 52.

The first and second instruction outputs 51 and 52 each output a first instruction and a second instruction in response to inputs of operation instructions to the touch panel 40. The first instruction is an instruction to control the propulsion machine 3. The second instruction is an instruction to switch the screen display of the display 41 and to identify information to be displayed on the display screen of the display 41. The first instruction may include an instruction to switch the display screen of the display 41 that controls the propulsion machine 3. When the first instruction is a control instruction to be provided to the propulsion machine 3, the first instruction is supplied to the electronic controller 4. The electronic controller 4 controls actuators included in the propulsion machine 3 according to the first instruction.

The lock cancellation button 45 is a physical operation switch to cancel the locked state of the touch panel 40. Immediately after power is supplied to the vessel touch panel device 2, the touch panel 40 is controlled to be in the locked state, and is in an inactive state where the operation instruction input to the sensor sheet 42 is not received. When in this state, the lock cancellation button 45 is operated, a lock cancellation signal is input to the processor 43. Thus, the locked state of the touch panel 40 is cancelled and brought into a state where the input to the sensor sheet 42 is able to be received. In association with the lock cancellation button 45, a button light 46 that illuminates the lock cancellation button 45 from behind is provided. The button light 46 includes, for example, a light-emitting diode, and is able to make the lock cancellation button 45 emit blue light, red light, or light of an intermediate color between blue and red. The light emission state (the light emission color, in particular) of the button light 46 is controlled by the processor 43.

When the lock cancellation button 45 is operated with the touch panel 40 in the locked state, if predetermined conditions are satisfied, the controller 50 cancels the locked state of the touch panel 40 and performs activation control to maintain the lock cancellation state without the lock cancellation button 45 being performed. When the predetermined conditions are satisfied in the lock cancellation state, the controller 50 performs deactivation control to bring the touch panel 40 into the locked state.

Figure 3:
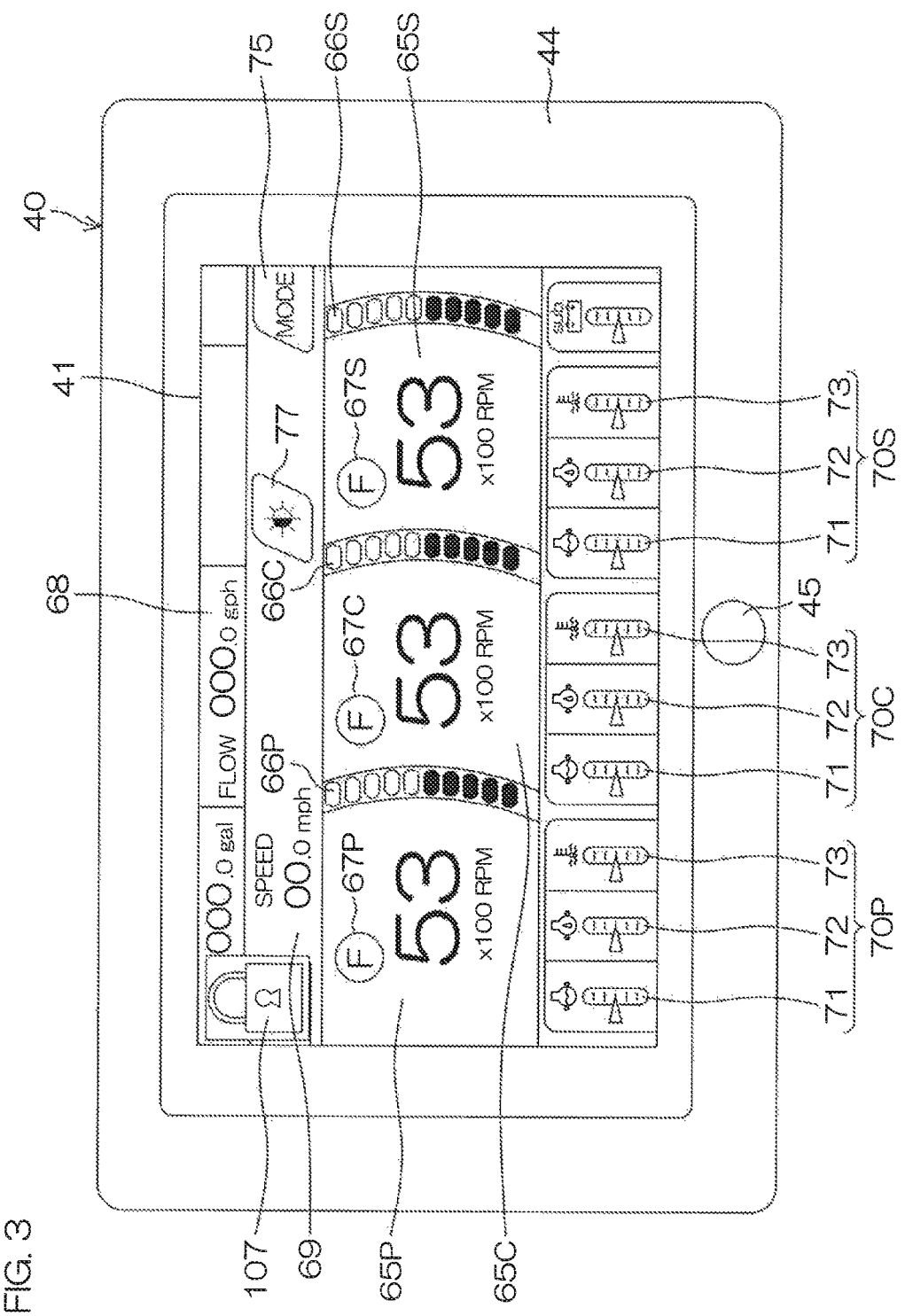
FIG. 3 is a plan view showing an example of a specific arrangement of a touch panel.

FIG. 3 is a plan view showing an example of a specific arrangement of the touch panel 40. The touch panel 40 includes a frame 44 preferably having the shape of a quadrangle, and the display 41 is disposed such that the display screen is exposed within the frame 44. The sensor sheet 42 is disposed on the surface of the display screen of the display 41. In the frame 44, the lock cancellation button 45 is provided. In this preferred embodiment, in the lower side portion of the frame 44 having the shape of a quadrangle, the lock cancellation button 45 which is preferably circular in plan view is disposed. The lock cancellation button 45 is a physical operation switch that is disposed outside the display screen of the display 41, that is, is arranged outside the detection region of the sensor sheet 42. The lock cancellation button 45 is attached to the frame 44 so as to be integral with the touch panel 40.

Figure 4:
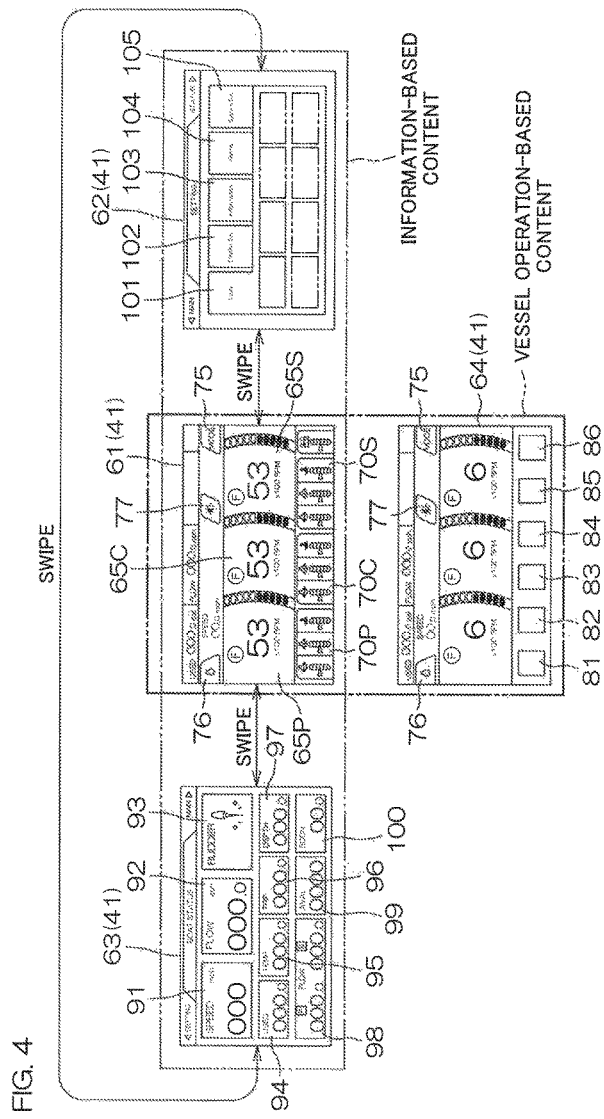
FIG. 4 shows an example of a screen displayed on the display of the touch panel.

FIG. 4 shows an example of a screen displayed on the display 41 of the touch panel 40. The display information is supplied from the processor 43, and thus on the display 41 of the touch panel 40, a main screen 61, a setting screen 62, a state display screen 63, and a vessel operation screen 64 are able to be switched and displayed. When a swipe operation in the left/right direction is performed, the main screen 61, the setting screen 62, and the state display screen 63 are sequentially and circularly switched and displayed on the display screen. The main screen 61, the setting screen 62, and the state display screen 63 provide information-based content. When a mode switch button 75 displayed within the main screen 61 is operated, it is possible to switch to the vessel operation screen 64. When the mode switch button 75 displayed within the vessel operation screen 64 is operated, it is possible to switch to the main screen 61. The main screen 61 and the vessel operation screen 64 provide vessel operation-based content.

As also shown in FIG. 3, the main screen 61 includes three engine rotation speed display portions 65P, 65C, and 65S that display the engine rotation speeds of the three propulsion machines 3P, 3C, and 3S. The main screen 61 further includes trim angle display portions 66P, 66C, and 66S that are disposed on the right side of the engine rotation speed display portions 65P, 65C, and 65S and that respectively display the trim angles of the corresponding propulsion machines 3P, 3C, and 3S. The main screen 61 further includes shift position display portions 67P, 67C, and 67S that are disposed above the engine rotation speed display portions 65P, 65C, and 65S and that respectively display the shift positions of the corresponding propulsion machines 3P, 3C, and 3S. The main screen 61 further includes a fuel flow rate display portion 68 that displays the total fuel flow rates in the three propulsion machines 3P, 3C, and 3S, a vessel speed display portion 69 that displays the speed of the vessel and individual state display portions 70P, 70C, and 70S that display the individual states of the propulsion machines 3P, 3C, and 3S. Each of the individual state display portions 70P, 70C, and 70S includes a lubricant pressure display portion 71, a coolant pressure display portion 72, and a coolant temperature display portion 73.

The main screen 61 further includes, as operation buttons that are able to be operated by the operator, in addition to the mode switch button 75 described previously, a start button 76 and a brightness setting button 77. The start button 76 is a button that is operated by the operator so as to start the engines 21 of the three propulsion machines 3P, 3C, and 3S simultaneously. The brightness setting button 77 is a button that is operated so as to set the display brightness of the display 41. The mode switch button 75 is a button that is operated by the operator so as to switch to the vessel operation screen 64.

When the vessel operation screen 64 is compared with the main screen 61, the vessel operation screen 64 differs therefrom in the display of a lower region. That is, in the region of the main screen 61 where the individual state display portions 70P, 70C, and 70S are disposed, a plurality of buttons that operate the propulsion machines 3P, 3C, and 3S are disposed. More specifically, a pattern shift button 81, a water sports mode button 82, an autocruise button 83, an autotrim button 84, a one lever button 85, and a battery management button 86 are disposed in the left/right direction. The pattern shift button 81 is used when the shift mechanism of the propulsion machine 3 is alternately switched between the neutral position and a drive position (the forward position or the backward position) to make the vessel travel at a low speed. The water sports mode button 82 is used to gradually accelerate the vessel from a stop state to make the vessel travel at a constant speed when a water sport such as water skiing is performed. The autocruise button 83 is used to make the vessel travel at a constant speed. The autotrim button 84 is used to automatically control the trim angle of the propulsion machine 3 according to the engine speed. The one lever button 85 is used when instead of operating a plurality of levers (the remote control lever 6) corresponding to the three propulsion machines 3, one lever is used to simultaneously control the outputs of the three propulsion machines 3. The battery management button 86 is operated to drive, when the shift position is neutral, the engine 21 at a low speed so as to charge the battery 7.

The state display screen 63 includes a vessel speed display 91, a total fuel flow rate display 92, a steering angle display 93, a used fuel accumulated value display 94, a water temperature display 95, a display 96 of fuel consumed in the present water travel, a water depth display 97, a display 98 of the flow rate of fuel per propulsion machine, a display 99 of the remaining amount of fuel, and a display 100 of fuel efficiency.

The setting screen 62 includes a log tab 101, a display setting tab 102, an information tab 103, an alarm tab 104, and a system setting tab 105. By operating the individual tabs 101 to 105, it is possible to make individual settings. In the log tab 101, it is possible to refer to information recorded at the time of past water travel. In the display setting tab 102, it is possible to select and set information items to be displayed on the individual display screens, particularly on the main screen 61 and the vessel operation screen 64. In the information tab 103, it is possible to display detailed information on the type of the fuel tank 11 and the like. In the alarm tab 104, it is possible to refer to the past failure history. In the system setting tab 105, it is possible to set the details of automatic control corresponding to the automatic control buttons 81 to 86 on the vessel operation screen 64.

The operation buttons displayed on the touch panel 40 are classified into limited buttons whose operations are limited according to the state of the vessel touch panel device 2 and non-limited buttons whose operations may be allowed even when the operation of the limited button is limited. The limited buttons include, for example, the mode switch button 75, the start button 76, the pattern shift button 81, the water sports mode button 82, the autocruise button 83, the autotrim button 84, the one lever button 85, the battery management button 86, and the system setting tab 105. These are operation buttons that input a first operation instruction that is an operation instruction to the propulsion machine 3. In addition, in this preferred embodiment, the brightness setting button 77 and the display setting tab 102 are also classified into the limited buttons. On the other hand, in this preferred embodiment, the non-limited buttons include the log tab 101, the information tab 103, and the alarm tab 104. These are operation buttons that input a second operation instruction that is an operation instruction other than the operation instruction to the propulsion machine 3.

Figure 5:
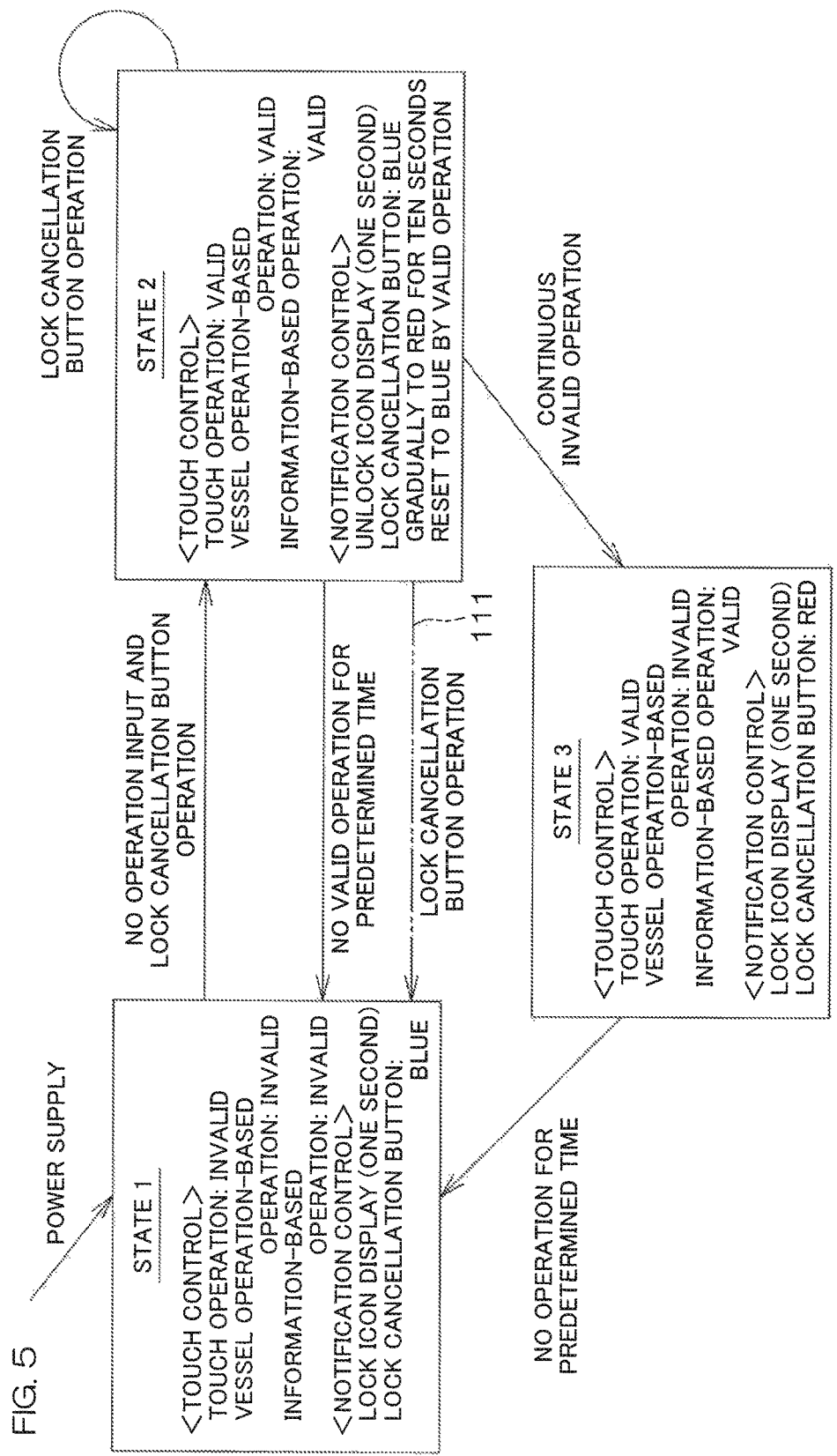
FIG. 5 is a diagram for illustrating a transition of the control state of a processor included in the vessel touch panel device.

FIG. 5 is a diagram for illustrating a transition of the state of the vessel touch panel device 2, more specifically, the control state of the processor 43. In this preferred embodiment, the processor 43 is able to enter three control states, that is, a state 1, a state 2, and a state 3, and the control state is changed among them. FIG. 6A is a flowchart for illustrating an operation of the processor 43 (in particular, the controller 50) in state 1. FIG. 6B is a flowchart for illustrating an operation of the processor 43 (in particular, the controller 50) in state 2. FIG. 6C is a flowchart for illustrating an operation of the processor 43 (in particular, the controller 50) in state 3. The state 1 corresponds to a "first state" in a preferred embodiment of the present invention. The state 2 corresponds to a "second state" in a preferred embodiment of the present invention. The state 3 corresponds to a "first state" or a "third state" in a preferred embodiment of the present invention.

When power is supplied to the vessel touch panel device 2, state 1 is set as the initial state.

In state 1, the operation on the touch panel 40 is invalidated. In other words, the touch panel 40 is brought into the locked state (step S1). More specifically, the vessel touch panel device 2 does not respond to operations on the limited button nor the non-limited button. Hence, a vessel operation-based operation which is an operation instruction to the propulsion machine 3 is invalidated, and an information-based operation which is an operation on the other buttons is also invalidated. In other words, both the first instruction output 51 (see FIG. 2) and the second instruction output 52 are brought into the inactive state.

On the other hand, when the processor 43 starts state 1, the processor 43 displays a lock icon 107 (see FIG. 3) on the display screen of the display 41 for a predetermined time (for example, one second) (step S2). In this way, the start of state 1 is notified to the user, and the user is able to recognize that the touch operation input is invalidated. The processor 43 controls the button light 46 to make the lock cancellation button 45 emit blue light (step S3). In this way, the information that the operation on the lock cancellation button 45 is valid is notified to the user.

When in state 1, the lock cancellation button 45 is operated, and the lock cancellation signal is input to the processor 43 accordingly (step S4: YES), the processor 43 determines, when the lock cancellation signal is input, whether or not a touch operation on the touch panel 40 is detected (step S5). Then, when the lock cancellation signal is input, and a touch operation input at that time is not produced (step S5: NO), the processor 43 sets the control state to state 2 (step S6) to change it to state 2. The "when the lock cancellation signal is input" may be a predetermined time (for example, one second) immediately before the input of the lock cancellation signal, a predetermined time (for example, one second) immediately after the input of the lock cancellation signal, or a predetermined time (for example, the total of two seconds, one second before and one second after) immediately before and after the input of the lock cancellation signal.

When the state is changed to state 2, the processor 43 validates the touch operation to bring the touch panel 40 into the lock cancellation state where any of the vessel operation-based operation and the information-based operation is received (step S11). Hence, any of the limited button and the non-limited button is able to be operated, and the processor 43 responds to the operation thereof. That is, the vessel operation-based operation which is the operation instruction to the propulsion machine 3 is validated, and the information-based operation which is the operation on the other buttons is also validated. In other words, both the first instruction output 51 (see FIG. 2) and the second instruction output 52 are brought into the active state.

On the other hand, when the processor 43 starts state 2, the processor 43 displays an unlock icon on the display screen of the display 41 for a predetermined time (for example, one second) (step S12). In this way, the start of state 2 is notified to the user, and the user is able to recognize that the lock cancellation button 45 functions in a valid manner. The processor 43 resets and starts an internal timer (step S13), further makes the button light 46 of the lock cancellation button 45 emit blue light (step S14), and notifies the user of the information that the operation of the lock cancellation button 45 is valid.

When during state 2, the lock cancellation button 45 is operated, and thus the lock cancellation signal is input (step S15: YES), the timer is reset and restarted (step S13). On the other hand, when a touch operation input to the touch panel 40 is detected (step S16: YES), the processor 43 determines whether the touch operation is valid or invalid (step S17). The invalid touch operation refers to a touch operation on the region other than the operation buttons within the display screen. When the valid touch operation is detected (step S17: valid), that is, the limited button or the non-limited button is operated, an instruction corresponding to the operation is output (step S18: the function of the first instruction output 51 or the second instruction output 52). In this case, the processor 43 resets the timer to restart the time measurement (step S13).

When the touch operation input is invalid (step S17: invalid), the processor 43 gradually changes, according to the time measured by the timer, the color of light emission of the button light 46 is gradually changed from blue to red (step S19). When the invalid touch operation input is continued (step S20: YES), the control state is set to state 3 (step S21), and is changed to state 3. That the invalid touch operation input is continued means that a time interval between a certain invalid operation input and the subsequent invalid operation input falls within a predetermined determination time (for example, one second) and that a valid touch operation is not produced between the invalid operation inputs.

When a valid touch operation input is not produced for a predetermined time T1 (for example, 10 seconds), and continuous invalid touch operation inputs are not detected for the predetermined time T1 (step S22: YES), the processor 43 sets the control state to state 1 (step S23) to change it to state 1. Regardless of whether the touch operation input is valid or invalid, when the state where the touch operation input is not produced is continued (step S16: NO), and the timer measures the predetermined time T1 (an example of a third predetermined time) (step S22: YES), the processor 43 sets the control state to state 1 (step S23). Before the timer measures the predetermined time T1 (step S22: NO), the processing from the determination as to whether or not the touch operation is performed (step S16) is repeated.

In state 3, the processor 43 validates the touch operation. Specifically, the processor 43 invalidates the vessel operation-based operation whereas the processor 43 validates the information-based operation (step S31). More specifically, the vessel touch panel device 2 does not respond to the operation on the limited button but responds to the operation instruction of the operation on the non-limited button. Hence, the vessel operation-based operation which is the operation instruction to the propulsion machine 3 is invalidated, and the information-based operation which is the operation on the other buttons is partially validated. In other words, the first instruction output 51 (see FIG. 2) is brought into the inactive state, and the second instruction output 52 is brought into the active state for the operation of a portion of the information-based operation buttons.

When the processor 43 starts state 3, the processor 43 displays the lock icon 107 (see FIG. 3) on the display screen of the display 41 for a predetermined time (for example, one second) (step S32) to notify the user of the information that the state is changed to state 3. In this way, the user is able to recognize that the touch operation input is limited. The processor 43 makes the button light 46 emit red light and makes the lock cancellation button 45 emit red light (step S33) to produce a display indicating that the lock cancellation button 45 does not respond. Then, the processor 43 resets and starts the internal timer (step S34). In state 3, the processor 43 does not respond to the operation on the lock cancellation button 45. Hence, even when the user operates the lock cancellation button 45, nothing happens, and the state is not changed.

When the processor 43 detects a touch operation input to the touch panel 40 (step S35: YES), the processor 43 determines whether the operation input is the vessel operation-based operation, the information-based operation or the invalid operation (step S36). However, here, for convenience, the operation on the limited button is classified into the vessel operation-based operation, the operation on the non-limited button is classified into the information-based operation, and the touch operation on the region other than the operation buttons is classified into the invalid operation.

When the operation input is the vessel operation-based operation or the invalid operation (step S36: the vessel operation-based/the invalid), the timer is reset, and the time measurement is restarted (step S34). On the other hand, when the operation input is the information-based operation (step S36: the information-based), an instruction corresponding to the operation is output (step S37). Thereafter, the timer is reset, and the time measurement is restarted (step S34).

When the state where an operation input to the touch panel 40 is not produced is continued for a predetermined time T2 (for example, 10 seconds) (step S38: YES), the processor 43 sets the control state to state 1 (step S39) to change it to state 1.

As described above, in this preferred embodiment, when power is supplied to the vessel touch panel device 2, the state is brought into state 1, that is, the initial state where the processor 43 does not respond to an input of the operation instruction to the touch panel 40. Hence, even when power is supplied under conditions in which seawater splashes, raindrops or the like reach the surface of the touch panel 40, the touch panel 40 does not respond to such seawater splashes, raindrops or the like, with the result that it is possible to avoid an erroneous operation on the propulsion machine 3.

When in state 1, the operator operates the lock cancellation button 45, the processor 43 is transferred to state 2, and performs activation control such that the input of the operation instruction to the touch panel 40 is invalidated. Since state 2 is retained for at least the predetermined time T1 (an example of a first predetermined time) even if the lock cancellation button 45 is not operated, the operator is able to operate the touch panel 40 with one hand while releasing the hand from the lock cancellation button 45. In this way, the operator is able to maintain the posture on the pitching and rolling vessel, and thus the erroneous operation is reduced.

On the other hand, when the operator does not produce an operation instruction input to the touch panel 40 and leaves it as it is, the timer completes the time measurement for the predetermined time T1 (an example of a second predetermined time), with the result that the state is automatically changed to state 1 to invalidate the operation instruction to the touch panel 40. In this way, it is possible to avoid an erroneous operation. Moreover, the operator does not need to perform an operation for returning to state 1 and to memorize such an operation. Since the return to state 1 is automatically performed, the user does not need to determine whether or not the state is returned to state 1.

When an instruction input to the touch panel 40 is needed, since the user only needs to operate the lock cancellation button 45, the operation is simple. Moreover, the user only needs to memorize the operation input to the touch panel 40. In other words, it is not necessary to memorize the complicated operations of a large number of physical operation switches.

In this preferred embodiment, when the lock cancellation button 45 is operated to generate the lock cancellation signal, state 1 is changed to state 2 on condition that no touch operation is performed before and after the operation thereof. In this way, it is possible to reliably invalidate the operation instruction to the touch panel 40, and thus it is possible to more reliably avoid an erroneous operation.

In this preferred embodiment, when in state 2, the invalid operation is continued a plurality of times, state 2 is changed to state 3, and thus the vessel operation-based operation is invalidated, with the result that it is possible to reduce the erroneous operation of the propulsion machine 3 caused by seawater splashes or the like.

In this preferred embodiment, when in state 2, the lock cancellation button 45 is operated to input the lock cancellation signal, the time measurement of the timer is reset and restarted, and thus it is possible to extend the duration time of state 2. Hence, even when an operation input to the touch panel 40 is not produced, by operating the lock cancellation button 45, it is possible to easily maintain the state where an input to the touch panel 40 is produced.

Even when in state 2, the invalid touch operation input is continued and state 2 is changed to state 3, since a portion of the information-based operation input is able to be received, while an erroneous input related to the operation of the propulsion machine 3 is being avoided, the state where it is possible to respond to an operation instruction by the user as much as possible is achieved.

When in state 2, seawater splashes or the like cover to the surface of the touch panel, since the invalid operation input is continued, state 2 is automatically changed to state 3. In this way, it is possible to avoid the operation of the propulsion machine 3 caused by an unintentional erroneous input by the operator.

In this preferred embodiment, in state 2, the color displayed by the lock cancellation button 45 is gradually changed from blue to red over time. In this way, since it is possible to notify the user of the transfer of the state of the vessel touch panel device 2, the user is able to perform an operation while recognizing the state of the vessel touch panel device 2. The user is able to recognize that the valid time of the touch operation input is limited and also sense the remaining valid time of the touch operation input.

Furthermore, in this preferred embodiment, the state where the vessel touch panel device 2 responds to the operation of the lock cancellation button 45 is displayed by blue of the lock cancellation button 45, and the state where the vessel touch panel device 2 does not respond to the operation of the lock cancellation button 45 is displayed by red thereof. In this way, the user is able to recognize whether the operation of the lock cancellation button 45 is valid or invalid without operating the lock cancellation button 45.

Figure 7:
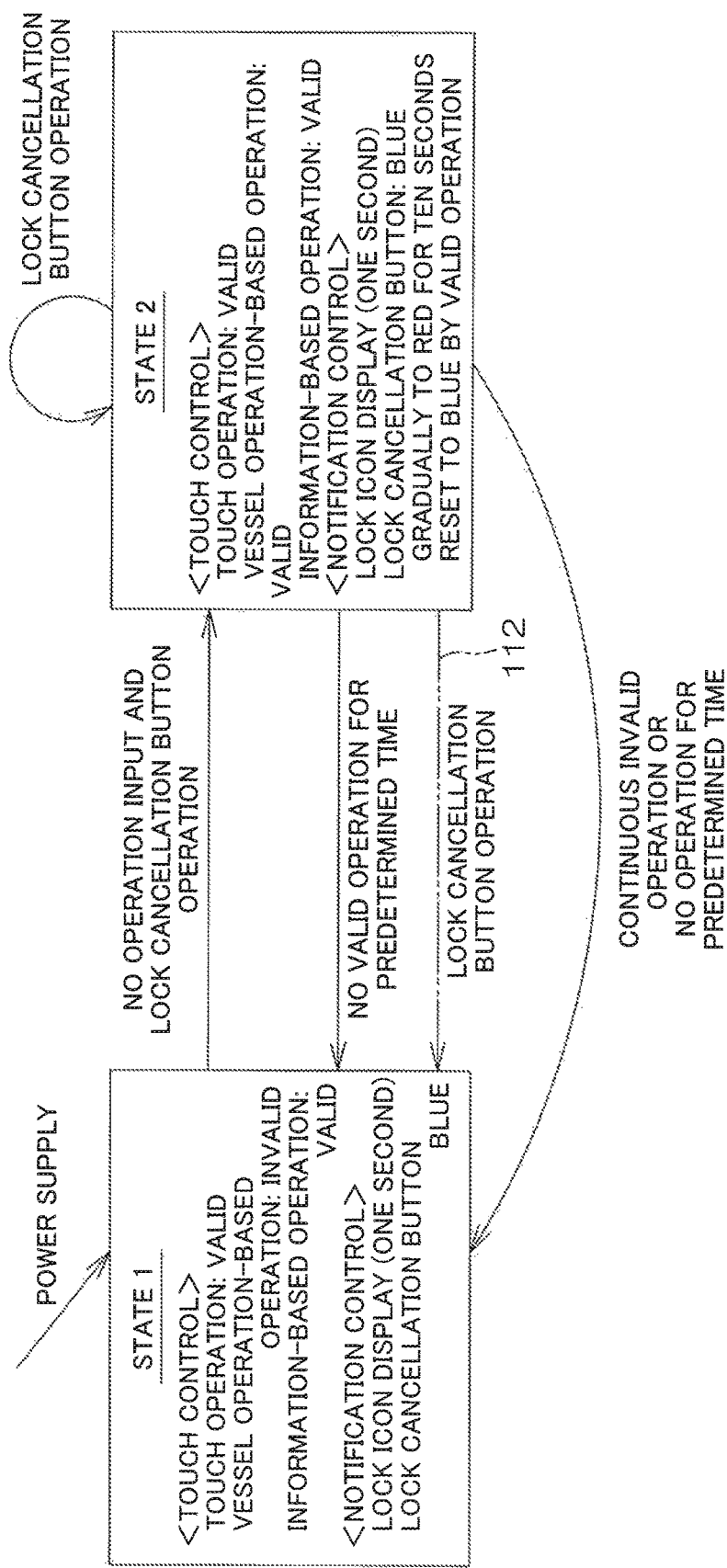
FIG. 7 is a diagram for illustrating a transition of the control state of a processor included in a vessel touch panel device according to a second preferred embodiment of the present invention.

FIG. 7 is a diagram for illustrating a transition of the state of a vessel touch panel device according to a second preferred embodiment of the present invention. FIGS. 8A and 8B are flowcharts for illustrating the operation of the processor 43 (in particular, the controller 50) in each state. This preferred embodiment will be described with reference back to FIGS. 1 to 4, which are previously described.

In this preferred embodiment, the state of the vessel touch panel device 2, that is, the control state of the processor 43 is able to enter state 1 and state 2. The control state of the processor 43 is changed between state 1 and state 2. Immediately after power is supplied, the processor 43 sets the control state to state 1. In other words, state 1 is the initial state.

In state 1, the processor 43 validates the touch operation. Specifically, the processor 43 invalidates the vessel operation-based operation whereas the processor 43 validates the information-based operation (step S41). More specifically, the vessel touch panel device 2 is brought into a state where the vessel touch panel device 2 does not respond to the operation of the limited button but responds to the operation instruction of the operation of the non-limited button. Hence, the vessel operation-based operation which is the operation instruction to the propulsion machine 3 is invalidated, and a portion of the information-based operation which is the operation on the other buttons is validated. In other words, the first instruction output 51 (see FIG. 2) is brought into the inactive state, and the second instruction output 52 is brought into the active state for the operation on a portion of the information-based operation buttons.

When the processor 43 starts state 1, the processor 43 displays the lock icon 107 (see FIG. 3) on the display screen of the display 41 for a predetermined time (for example, one second) (step S42) to notify the user of the information that the state is changed to state 3. The processor 43 makes the button light 46 emit blue light and makes the lock cancellation button 45 emit blue light (step S43), and thus displays the information that the lock cancellation button 45 responds to an operation.

When in state 1, the lock cancellation button 45 is operated, and the lock cancellation signal is input to the processor 43 accordingly (step S44: YES), the processor 43 determines, when the lock cancellation signal is input, whether or not a touch operation on the touch panel is detected (step S45). Then, when the lock cancellation signal is input and a touch operation input at that time is not produced (step S45: NO), the processor 43 sets the control state to state 2 (step S46) to change it to state 2. The "when the lock cancellation signal is input" may be a predetermined time (for example, one second) immediately before the input of the lock cancellation signal, a predetermined time (for example, one second) immediately after the input of the lock cancellation signal, or a predetermined time (for example, the total of two seconds, one second before and one second after) immediately before and after the input of the lock cancellation signal.

When the lock cancellation signal is not input (step S44: NO), and the processor 43 detects a touch operation input to the touch panel 40 (step S47: YES), the processor 43 determines whether the operation input is the vessel operation-based operation, the information-based operation or the invalid operation (step S48). However, here, for convenience, the operation on the limited button is classified into the vessel operation-based operation, the operation on the non-limited button is classified into the information-based operation and the touch operation on the region other than the operation buttons is classified into the invalid operation.

When the operation input is the vessel operation-based operation or the invalid operation (step S48: the vessel operation-based/the invalid), processing from the monitoring (step S44) of the input of the lock cancellation signal is repeated. On the other hand, when the operation input is the information-based operation (step S48; the information-based), an instruction corresponding to the operation is output (step S49). Thereafter, the processing from the monitoring (step S44) of the input of the lock cancellation signal is repeated.

The operation (FIG. 8B) of the processor in state 2 is preferably substantially the same as the case of the first preferred embodiment described previously. Hence, in FIG. 8B, steps corresponding to the steps of FIG. 6B are identified with the same reference symbols.

In this preferred embodiment, when in state 2, the invalid operation on the touch panel 40 is continued (step S20: YES), the processor 43 sets the control state to state 1 (step S23) to automatically change it to state 1.

As described above, in this preferred embodiment, in state 1, the vessel touch panel device 2 does not respond to the vessel operation-based operation related to the operation of the propulsion machine 3 and responds to only the information-based operation. In this way, it is possible to provide the vessel touch panel device 2 that achieves both the erroneous input prevention and convenience.

In this preferred embodiment, state 1 and state 2 are examples of the first state and the second state, respectively.

Although preferred embodiments of the present invention have been described above, as illustrated below, the present invention can be carried out with other preferred embodiments.

As indicated by two-dot chain line arrows 111 and 112 in FIGS. 5 and 7, when in state 2, the lock cancellation button 45 is operated, and state 2 may be changed to state 1. In this way, the user is able to bring the vessel touch panel device 2 into state 1 where the vessel touch panel device 2 does not respond to a touch input for the operation of the propulsion machine 3 at any time.

In the preferred embodiments described above, the time period after the transfer of state 1 to state 2, the time period during which the valid operation is not input and the time period during which the continuous invalid operation is not detected are measured with the common timer, and when the timer measures the predetermined time T1 (for example, 10 seconds), state 2 is transferred to state 1 (step S22: NO). The time periods may be measured with individual timers. In that case, preferably, whether the time period after the transfer of state 1 to state 2 reaches the first predetermined time, whether the time period during which the valid operation is not input reaches the second predetermined time and whether the time period during which a touch operation is not detected reaches the third predetermined time regardless of whether or not the operation is valid or invalid are individually determined. When one or more of the determination results (preferably, all the determinations) are positive, state 2 may be transferred to state 1. In other words, the preferred embodiments described above are non-limiting examples where the first predetermined time, the second predetermined time, and the third predetermined time are equally set.

In the second preferred embodiment described above, when the invalid operation is continued (step S20: YES), the state is immediately transferred to state 1. However, only when the determination as to whether the invalid operation is continued is omitted, and the measurement of the predetermined time T1 by the timer is completed, the state may be transferred to state 1. As described above, when in state 2, the lock cancellation button 45 is operated, state 1 may be transferred to state 1 regardless of the time measured by the timer.

In the preferred embodiments described above, the lock cancellation button 45 is an example of the activation operator provided integrally with the touch panel 40. However, the activation operator may be provided separately from the touch panel.

In the preferred embodiments described above, the lock cancellation button 45 integrally includes the button light 46 serving as a notifier which notifies the state of the vessel touch panel device 2 and the transition thereof. However, by providing an indicator separately from the lock cancellation button 45, the same function may be achieved. On the display screen of the display 41, a time-varying display indicating a time that has elapsed since the transition to state 2 may be used.

In the preferred embodiments described above, the lighting color of the button light 46 is controlled so as to mainly indicate whether or not the operation of the lock cancellation button 45 is received, and the state of the vessel touch panel device 2 is indicated by the lighting color. However, when the notifier is provided separately from the lock cancellation button 45, regardless of whether or not the operation on the lock cancellation button 45 is received, the state of the vessel touch panel device 2 may be indicated.

The notifier does not need to be arranged to act on the vision of the user, and may be arranged to act on the auditory sense and the tactile sense of the user.

The type of the propulsion machine, the number of propulsion machines, the type of the prime mover and the like included in the vessel are arbitrary. In other words, the propulsion machine may be a type other than an outboard motor such as an inboard motor, an inboard/outboard motor, or a water jet. The vessel may include one, two, or four or more propulsion machines. Furthermore, the prime mover may be an electric motor or a hybrid type in which an internal combustion engine and an electric motor are combined.

The present application claims priority to Japanese Patent Application No. 2015-086926 filed in the Japan Patent Office on Apr. 21, 2015, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel touch panel device to be mounted on a vessel including a propulsion machine, the vessel touch panel device comprising:
    a touch panel;
    a first instruction output that outputs, when a first operation instruction to the propulsion machine is input to the touch panel, a first instruction corresponding to the first operation instruction;
    a second instruction output that outputs, when a second operation instruction excluding an operation instruction to the propulsion machine is input to the touch panel, a second instruction corresponding to the second operation instruction;
    a non-touch panel type activation operator that is operated by a user to transfer a state of the vessel touch panel device from a first state where the first instruction output is inactive to a second state where the first instruction output is active, and that is provided separately from the touch panel; and
    a controller configured or programmed to perform:
        activation control when a predetermined first condition is satisfied when in the first state and the activation operator is operated, the first state is transferred to the second state, and even when the activation operator is not operated the second state is retained; and
        deactivation control when a predetermined second condition is satisfied in the second state, the second state is transferred to the first state.

2. The vessel touch panel device according to claim 1, wherein the first condition includes a condition in which an activation signal is generated by the operation of the activation operator.

3. The vessel touch panel device according to claim 1, wherein the first condition includes a condition in which, when the activation operator is operated, an operation input to the touch panel is not detected.

4. The vessel touch panel device according to claim 1, wherein the second condition includes a condition in which a first predetermined time has elapsed after the transfer from the first state to the second state.

5. The vessel touch panel device according to claim 1, wherein the second condition includes a condition in which each of the first operation instruction and the second operation instruction is not input for a second predetermined time or longer.

6. The vessel touch panel device according to claim 5, wherein the second condition further includes a condition in which an invalid operation input to the touch panel is not detected for a third predetermined time or longer.

7. The vessel touch panel device according to claim 1, wherein the second condition includes a condition in which an invalid operation input to the touch panel is continued a plurality of times.

8. The vessel touch panel device according to claim 1, wherein immediately after power is supplied to the vessel touch panel device, the controller is configured or programmed to control the vessel touch panel device such that the vessel touch panel device is in the first state.

9. The vessel touch panel device according to claim 1, wherein when in the second state the activation operator is operated, the controller is configured or programmed to continue the second state.

10. The vessel touch panel device according to claim 1, wherein the first instruction output and the second instruction output are inactive in the first state, and the first instruction output and the second instruction output are active in the second state.

11. The vessel touch panel device according to claim 10, wherein the vessel touch panel device further includes a third state where the first instruction output is inactive and the second instruction output is active, and when in the second state an invalid operation input to the touch panel is detected, the controller is configured or programmed to transfer the vessel touch panel device to the third state.

12. The vessel touch panel device according to claim 11, wherein when in the second state, the invalid operation input to the touch panel is continued a plurality of times, the controller is configured or programmed to transfer the vessel touch panel device to the third state.

13. The vessel touch panel device according to claim 1, wherein in each of the first state and the second state, the second instruction output is active.

14. The vessel touch panel device according to claim 1, further comprising:
    a notifier that notifies the user of a transfer of a state of the vessel touch panel device which is changed over time.

* * * * *